(12) United States Patent
Ha et al.

(10) Patent No.: US 7,471,029 B2
(45) Date of Patent: Dec. 30, 2008

(54) FREQUENCY-CONTROL-TYPE PIEZO ACTUATOR DRIVING CIRCUIT AND METHOD OF DRIVING THE SAME

(75) Inventors: Chang Woo Ha, Suwon (KR); Jung Chul Gong, Seoul (KR); Sang Cheol Shin, Pyeongtaek (KR); Byoung Own Min, Suwon (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 163 days.

(21) Appl. No.: 11/435,744

(22) Filed: May 18, 2006

(65) Prior Publication Data

US 2007/0029896 A1   Feb. 8, 2007

(30) Foreign Application Priority Data

Aug. 8, 2005   (KR) .................. 10-2005-0072257

(51) Int. Cl.
*H01L 41/08* (2006.01)
(52) U.S. Cl. .............. 310/316.01; 310/317; 310/319
(58) Field of Classification Search ............ 310/316.01, 310/317
See application file for complete search history.

(56) References Cited

U.S. PATENT DOCUMENTS

| | | | | |
|---|---|---|---|---|
| 3,842,340 A | * | 10/1974 | Brandquist .................. | 363/96 |
| 4,445,063 A | * | 4/1984 | Smith .................... | 310/316.01 |
| 4,888,565 A | * | 12/1989 | Littleford et al. .............. | 331/25 |
| 4,965,532 A | * | 10/1990 | Sakurai ........................ | 331/4 |
| 6,545,390 B1 | * | 4/2003 | Hahn et al. .................. | 310/317 |
| 6,577,042 B2 | * | 6/2003 | Lee et al. .................... | 310/317 |

FOREIGN PATENT DOCUMENTS

| EP | 0 764 261 B1 | 3/1997 |
|---|---|---|
| JP | 01-288378 A | 11/1989 |
| JP | 2002-514958 A | 5/2002 |
| JP | 2002-165469 A | 6/2002 |
| JP | 2003-21779 A | 1/2003 |

OTHER PUBLICATIONS

Japanese Patent Office, Office Action issued Sep. 30, 2008.

* cited by examiner

*Primary Examiner*—Mark Budd
(74) *Attorney, Agent, or Firm*—Lowe Hauptman Ham & Berner (57) ABSTRACT

The present invention relates to a frequency-control-type piezo actuator driving circuit. The frequency-control-type piezo actuator driving circuit includes a piezo actuator that is driven by a constant amplitude of driving voltage pulse; a piezo driver that is connected to the piezo actuator so as to drive the piezo actuator; a frequency controller that is connected to the piezo driver so as to measure currents consumed when the piezo driver drives the piezo actuator, to detect a frequency corresponding to the maximum current among the measured currents, and to generate a frequency control signal corresponding to the detected frequency; and a frequency synthesizer that fixes a frequency of the piezo actuator in accordance with the frequency control signal of the frequency controller and generates the fixed frequency to the piezo driver.

20 Claims, 9 Drawing Sheets

FREQUENCY-CONTROL-TYPE PIEZO ACTUATOR DRIVING CIRCUIT AND METHOD OF DRIVING THE SAME

CROSS-REFERENCE TO RELATED APPLICATIONS

The application claims the benefit of Korea Patent Application No. 2005-0072257 filed with the Korea Industrial Property Office on Aug. 8, 2005, the disclosure of which is incorporated herein by reference.

BACKGROUND OF THE INVENTION

1. Field of the Invention

The present invention relates to a frequency-control-type piezo actuator driving circuit and a method of driving the same, and more specifically, to a frequency-control-type piezo actuator driving circuit which can measure currents consumed by a piezo actuator to automatically control a resonant frequency so that the driving efficiency of the piezo actuator can be enhanced, can control a change in the resonant frequency due to process variation and temperature change, and can be protected even when being short-circuited or open-circuited, and a method of driving the same.

2. Description of the Related Art

The current mobile phone market rapidly grows more than 20% every year. Recently, it is required to develop a mobile phone having various functions added thereto as well as a function of transmitting voice.

Accordingly, such functions as a camera, PDA, MP3 player, media player and the like are added, and mobile phones corresponding to 40% of the overall mobile phones support a camera function. Current mobile phones mainly adopt a 350 thousand pixel camera module, but more and more mobile phones have a mega pixel camera module mounted thereon. Recently, as 5 mega pixel and 7 mega pixel camera phones are consecutively launched, a function of a camera module for mobile phone is also being enhanced. Particularly, as the direct competition with a digital camera is expected, an automatic focus function and automatic optical zoom function are required. In order to meet such requirements, it is urgent to implement a lens driving actuator and driver LSI, which have low power consumption and are small in size. Recently, such a technique as a lens driving method using a piezo element attracts attention.

In the driving method using a piezo element, noise and vibration does not occur at all and power consumption can be significantly reduced to ⅓, in comparison with a conventional method using a motor.

However, the piezo element operates when resonating at a voltage of more than or equal to 10V. Therefore, if a driving signal is not accurately adjusted to the resonant frequency, the piezo element does not operate normally, or the operation efficiency significantly decreases. Accordingly, it is important to set an accurate resonant frequency.

However, since the resonant frequency band of the piezo element is very narrow and the variation of the resonant frequency is very large at the time of manufacturing, it is difficult to set an accurate resonant frequency.

Figure 1A:
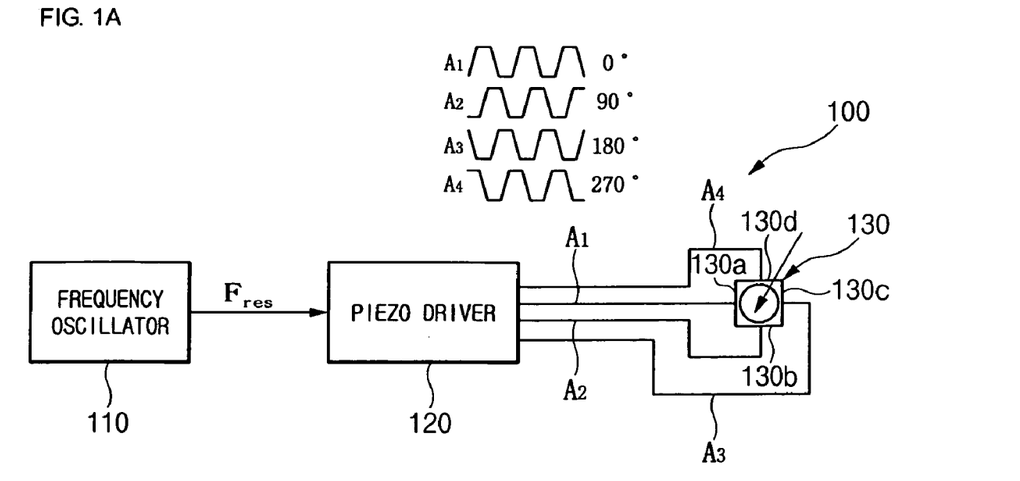
FIG. 1A is a block diagram showing a piezo actuator driving circuit according to the related art.
Figure 1B:
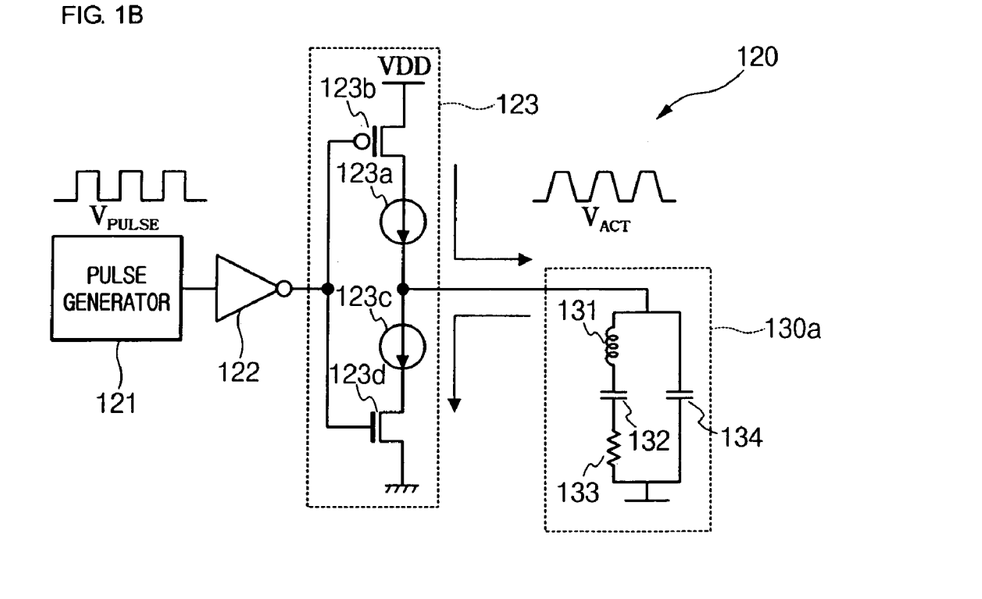
FIG. 1B is a circuit diagram showing a piezo driver and piezo element of the piezo actuator according to the related art.

FIG. 1A is a block diagram showing a piezo actuator driving circuit 100 according to the related art. FIG. 1B is a circuit diagram showing a piezo driver 120 and piezo element 130a of the driving circuit 100.

As shown in FIG. 1A, the conventional piezo actuator driving circuit 100 includes a frequency oscillator 110 which generates a resonant frequency $F_{res}$ of the piezo actuator 130, the piezo driver 120 which drives the piezo actuator 130, and a piezo actuator 130 composed of four piezo elements 130a to 130d.

The resonant frequency $F_{res}$ can be generated by an oscillator provided outside the driving circuit 100, and the piezo driver 120 outputs four phase signals A1 to A4 which can drive the piezo actuator 130.

As shown in FIG. 1B, the piezo driver 120 is composed of a pulse generator 121 which generates a voltage pulse $V_{PULSE}$ with a constant period, a first driver stage 122 which receives the voltage pulse $V_{PULSE}$ of the pulse generator 121 and buffers the voltage pulse $V_{PULSE}$ to output, and a second driver stage 123 which converts the voltage pulse $V_{PULSE}$, buffered and output by the first driver stage 122, into a current pulse to output.

The first driver stage 122, which is composed of a buffering inverter, serves to buffer the voltage pulse $V_{PULSE}$ generated by the pulse generator 121.

The second driver stage 123 is composed of a first current source 123a which transmits a current pulse for charging the piezo actuator 130, a first switching element 123b which receives the voltage pulse $V_{PULSE}$ of the pulse generator 121 and is connected to a power supply voltage VDD and the first current source 123a, a second current source 123c which transmits a current pulse for discharging the piezo actuator 130, and a second switching element 123d which receives the voltage pulse $V_{PULSE}$ of the pulse generator 121 and is connected to a ground voltage and the second current source 123c.

The first switching element 123b is a PMOS transistor, and the second switching element 123d is an NMOS transistor. The first and second switching elements 123b and 123d are turned on or off in accordance with the voltage pulse $V_{PULSE}$ applied by the pulse generator 121 so as to generate a current pulse for driving the piezo actuator 130.

The piezo elements composing the piezo actuator 130 can be modeled by a resistance, an inductor, and a capacitor passive element. Each of the piezo elements includes an inductor stage composed of an inductor 131, a first capacitor 132, and a resistance 133, which are connected in series, and a second capacitor 134 which is connected in parallel to the inductor stage so as to resonate and is charged and discharged by the current pulse generated by the second driver stage 123 so as to maintain a constant amplitude of driving voltage pulse $V_{ACT}$.

In the above-described conventional piezo actuator driving circuit, however, the resonant point changes due to the temperature change or process variation of the piezo element, when the resonant frequency output from the frequency oscillator is fixed. Therefore, it is impossible to control an accurate resonant frequency.

Since an accurate resonant frequency cannot be controlled, it is likely that the driving efficiency of the piezo actuator decreases or the piezo actuator does not operate.

Furthermore, the resonant frequency output from the frequency oscillator can be controlled from the outside. In this case, since a different resonant frequency should be adjusted for each piezo actuator, the productivity decreases and the manufacturing cost significantly increases.

SUMMARY OF THE INVENTION

An advantage of the present invention is that it provides a frequency-control-type piezo actuator driving circuit which can measure currents consumed by a piezo actuator to automatically control a resonant frequency so that the driving efficiency of the piezo actuator can be enhanced, can control a change in the resonant frequency due to process variation and temperature change, and can be protected even when being short-circuited or open-circuited, and a method of driving the same.

Additional aspects and advantages of the present general inventive concept will be set forth in part in the description which follows and, in part, will be obvious from the description, or may be learned by practice of the general inventive concept.

Figure 2A:
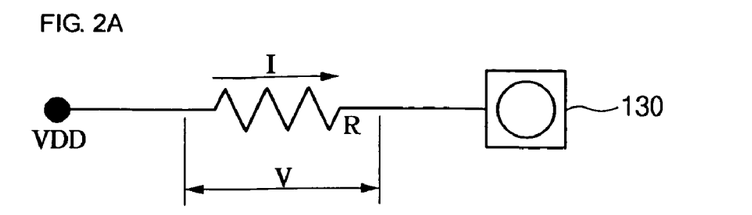
FIG. 2A is a diagram showing a method of measuring a current consumed by a piezo actuator according to the present invention.
Figure 2B:
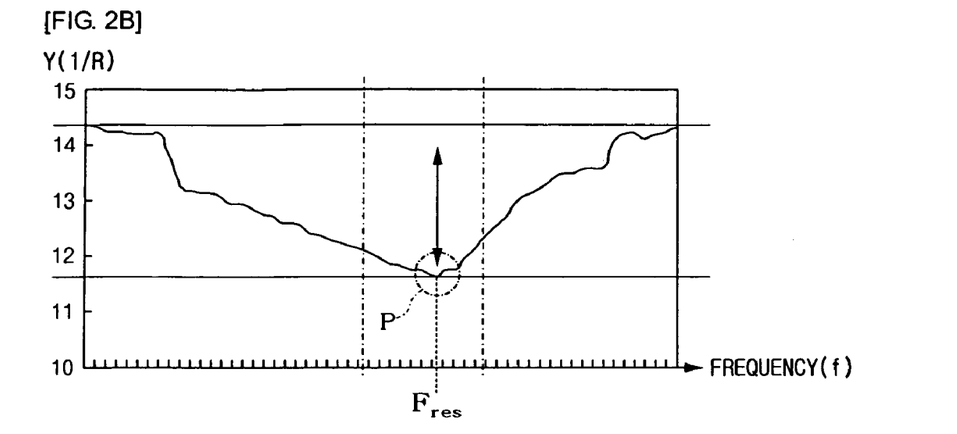
FIG. 2B is a diagram showing admittance in accordance with frequency in the piezo actuator according to the invention.

In the present invention, a current measuring method shown in FIG. 2A is used. FIG. 2A shows a method of measuring a current consumed by the piezo actuator according to the invention. FIG. 2B is a diagram showing admittance Y in accordance with a frequency of the piezo actuator according to the invention.

In order to measure an amount of current consumed by the piezo actuator 1 30, a resistance R is connected between a power supply terminal VDD and the piezo actuator to measure a current I flowing in the resistance R, as shown in FIGS. 2A and 2B. When the results measured by the method shown in FIG. 2A are represented by the admittance Y with respect to a frequency, the resonant frequency $F_{res}$ is adjusted at a point P where the voltage applied in both sides of the resistance is the greatest, that is, where the amount of consumed current I is the greatest so that the admittance is the smallest.

By using such characteristics, while the resonant frequency is changed at a predetermined interval, an amount of consumed current at each resonant frequency so that the resonant frequency is automatically controlled. Then, even when the resonant frequency changes due to process variation or temperature change, it is possible to drive the piezo actuator more effectively.

According to an aspect of the invention, a frequency-control-type piezo actuator driving circuit includes a piezo actuator that is driven by a constant amplitude of driving voltage pulse; a piezo driver that is connected to the piezo actuator so as to drive the piezo actuator; a frequency controller that is connected to the piezo driver so as to measure currents consumed when the piezo driver drives the piezo actuator, to detect a frequency corresponding to the maximum current among the measured currents, and to generate a frequency control signal corresponding to the detected frequency; and a frequency synthesizer that fixes a frequency of the piezo actuator in accordance with the frequency control signal of the frequency controller and generates the fixed frequency to the piezo driver.

The piezo driver includes a pulse generator that generates a voltage pulse with the fixed frequency; a first driver stage that receives the voltage pulse of the pulse generator and buffers the voltage pulse to output; and a second driver stage that converts the voltage pulse, buffered and output by the first driver stage, into a current pulse to output to the piezo actuator.

The first deriver stage is a buffering inverter.

The second driver stage includes a first current source that transmits a current pulse for charging the piezo actuator; a first switching element that receives a voltage pulse of the pulse generator and is connected to a power supply voltage and the first current source; a second current source that transmits a current pulse for discharging the piezo actuator; and a second switching element that receives a voltage pulse of the pulse generator and is connected to a ground voltage and the second current source.

The first switching element is a PMOS transistor, and the second switching element is an NMOS transistor.

When the voltage pulse of the pulse generator is low, the PMOS transistor is turned on to charge the piezo actuator.

When the voltage pulse of the pulse generator is high, the NMOS transistor is turned on to discharge the piezo actuator.

The piezo actuator includes an inductor stage composed of an inductor, a first capacitor, and a resistance, which are connected in series; and a second capacitor that is connected in parallel to the inductor stage so as to resonate and maintains the driving voltage pulse with a constant amplitude by charging and discharging the current pulse output by the second driver stage.

The frequency controller includes a current detector that is connected to the piezo driver so as to detect and measure currents consumed by the piezo driver; an analog-digital converter that is connected to the current detector so as to convert the measured current into digital data; a first register that is connected to the analog-digital converter so as to store the converted digital data; a micro control device that receives the digital data stored in the first register so as to detect frequency data corresponding to the digital data on the maximum current among the received digital data; a second register that stores frequency data detected by the micro control device; a control input/output device that is connected to the first and second registers and the micro control device so as to input the digital data of the first register to the micro control device and to output the frequency data of the micro control device to the second register; and a frequency signal controller that is connected to the second register and the frequency synthesizer so as to generate a frequency control signal to the frequency synthesizer in accordance with the frequency data of the second register.

The frequency-control-type piezo actuator driving circuit further includes a circuit protecting section that is connected to the piezo driver and the current detector so as to prevent the driving circuit from being short-circuited or open-circuited.

The circuit protecting section is composed of an open circuit protecting section and short circuit protecting section.

The amplitude of the driving voltage pulse is more than or equal to 10 peak voltage.

The frequency detected by the micro control device is a resonant frequency.

According to another aspect of the invention, a method of driving a frequency-control-type piezo actuator includes controlling a frequency by measuring currents consumed by a piezo driver driving the piezo actuator, detecting a frequency corresponding to the maximum current among the measured currents, and generating a frequency control signal corresponding to the detected frequency; fixing a frequency in accordance with the generated frequency control signal and generating the fixed frequency ; and generating a voltage pulse with the fixed frequency so as to drive the piezo actuator.

The step of controlling a frequency includes operating a timer with a constant period; setting an initial value of frequency; detecting and measuring a current corresponding to the set frequency; storing the measured current; searching the maximum current among the stored currents; determining whether the searched current is the maximum current or not; when the determined current is the maximum current, detecting a frequency corresponding to the maximum current so as to generate a frequency control signal corresponding to the detected frequency; and checking the timer so as to determine whether the period of the timer comes to an end or not.

When the determined current is not the maximum current, the frequency is swept by one level, and the step is fed back to the step of detecting and measuring a current.

When it is determined that the period of the timer does not come to an end, the step is fed back to the step of detecting a frequency.

When it is determined that the period of the timer comes to an end, the step is fed back to the step of operating a timer.

The step of detecting and measuring a current further includes protecting a driving circuit so as to prevent the circuit from being short-circuited and open-circuited.

The resonant frequency is detected in the step of detecting a frequency.

The step of generating a voltage pulse so as to drive the piezo actuator includes generating a voltage pulse with the frequency generated in the step of fixing and generating a frequency; buffering the generated voltage pulse; converting the buffered voltage pulse into a current pulse; when the generated voltage pulse is low, charging the piezo actuator with the converted current pulse; when the generated voltage pulse is high, discharging the piezo actuator with the converted current pulse; and maintaining a constant of driving voltage pulse through the steps of charging and discharging the piezo actuator so as to drive the piezo actuator.

In the step of maintaining a driving voltage pulse, the driving voltage pulse is maintained at more than or equal to 10 volts.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

First Embodiment

Figure 3A:
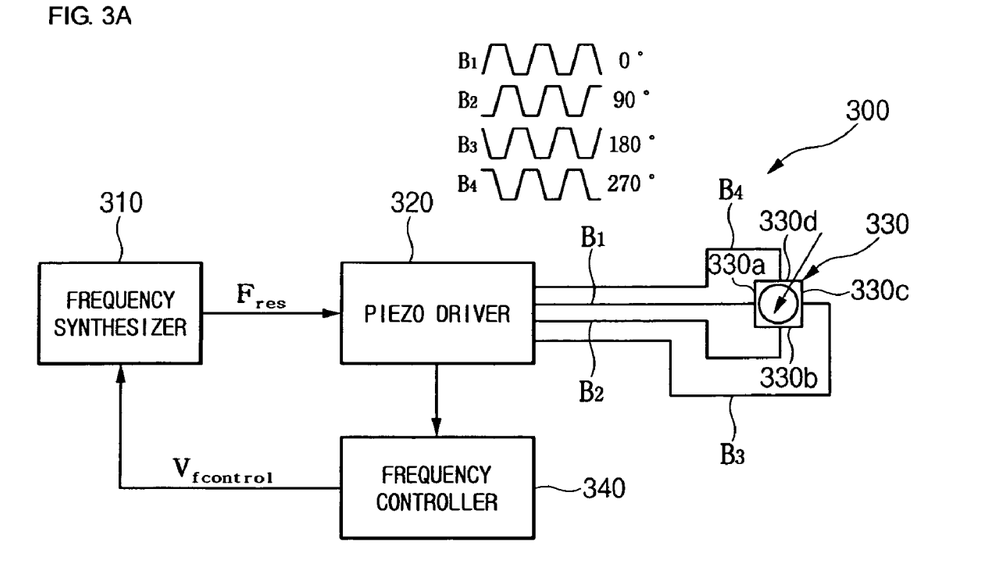
FIG. 3A is a block diagram showing a piezo actuator driving circuit according to first and second embodiments of the invention.
Figure 3B:
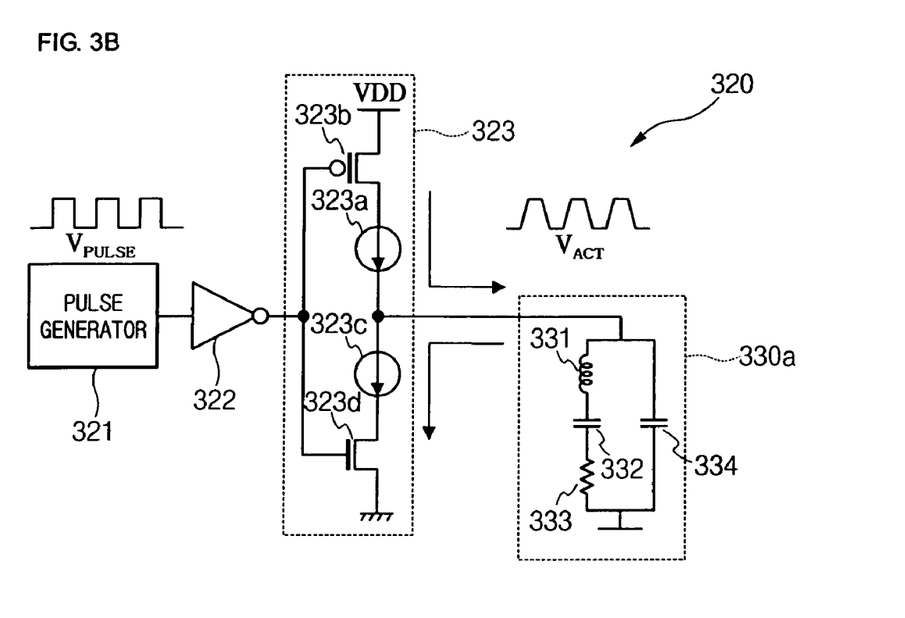
FIG. 3B is a circuit diagram showing a piezo driver and piezo element of the piezo actuator driving circuit according to the first and second embodiment of the invention.

FIG. 3A is a block diagram showing a piezo actuator driving circuit 300 according to a first embodiment of the invention. FIG. 3B is a circuit diagram showing a piezo driver 320 and piezo element 330a of the piezo actuator driving circuit 300.

As shown in FIG. 3A, the piezo actuator driving circuit 300 according to the first embodiment is composed of a piezo actuator 330 which is driven by a constant amplitude of driving voltage pulse, a piezo driver 320 which is connected to the piezo actuator 330 so as to drive the piezo actuator 330, a frequency controller 340 which is connected to the piezo driver 320 so as to measure currents consumed when the piezo driver 320 drives the piezo actuator 330, to detect a frequency corresponding to the maximum current among the measured currents, and to generate a frequency control signal $V_{fcontrol}$ corresponding to the detected frequency, and a frequency synthesizer 310 which fixes a frequency $F_{res}$ of the piezo actuator 330 in accordance with the frequency control signal $V_{fcontrol}$ of the frequency controller 340 and generates the fixed frequency $F_{res}$ to the piezo driver 320.

Here, the piezo driver 320 outputs four phase signals B1 to B4 which can drive the piezo actuator 330.

As shown in FIG. 3B, the piezo driver 320 is composed of a pulse generator 321 which generates a voltage pulse $V_{PULSE}$ with the fixed frequency, a first driver stage 322 which receives the voltage pulse $V_{PULSE}$ of the pulse generator 321 and buffers the voltage pulse $V_{PULSE}$ to output, and a second driver stage 323 which converts the voltage pulse $V_{PULSE}$, buffered and output by the first driver stage 322, into a current pulse to output to the piezo actuator 330.

The first driver stage 322, which is composed of a buffering inverter, serves to buffer the voltage pulse $V_{PULSE}$ generated by the pulse generator 321.

The second driver stage 323 is composed of a first current source 323a which transmits a current pulse for charging the piezo actuator 330, a first switching element 323b which receives the voltage pulse $V_{PULSE}$ of the pulse generator 321 and is connected to a power supply voltage VDD and the first current source 323a, a second current source 323c which transmit a current pulse for discharging the piezo actuator 330, and a second switching element 323d which receives the voltage pulse $V_{PULSE}$ of the pulse generator 321 and is connected to a ground voltage and the second current source 323c.

The first switching element 323b is a PMOS transistor, and the second switching element 323d is an NMOS transistor.

Therefore, the first and second switching elements 323b and 323d are turned on or off in accordance with the voltage pulse $V_{PULSE}$ applied by the pulse generator 321 so as to generate a current pulse for driving the piezo actuator 330.

When the voltage pulse $V_{PULSE}$ of the pulse generator 321 is low, the PMOS transistor 323b is turned on to charge the piezo actuator 330. When the voltage pulse $V_{PULSE}$ of the pulse generator 321 is high, the NMOS transistor 323d is turned on to discharge the piezo actuator 330. Such charge and discharge allows a constant amplitude of driving voltage pulse $V_{ACT}$ to be maintained, thereby driving the piezo actuator 330. At this time, the amplitude of the driving voltage pulse $V_{ACT}$ which can drive the piezo actuator 330 should be more than or equal to 10 peak voltage.

The piezo actuator 330 is composed of a plurality of piezo elements 330a to 330d, of which each is modeled by a resistance, an inductor, and a capacitor passive element. Each of the piezo elements 330a to 330d includes an inductor stage composed of an inductor 331, a first capacitor 332, and a resistance 333, which are connected in series, and a second capacitor 334 which is connected in parallel to the inductor stage so as to resonate and which maintains a constant amplitude of driving voltage pulse $V_{ACT}$ by charging and discharging the current pulse output from the second driver stage 323.

Figure 3C:
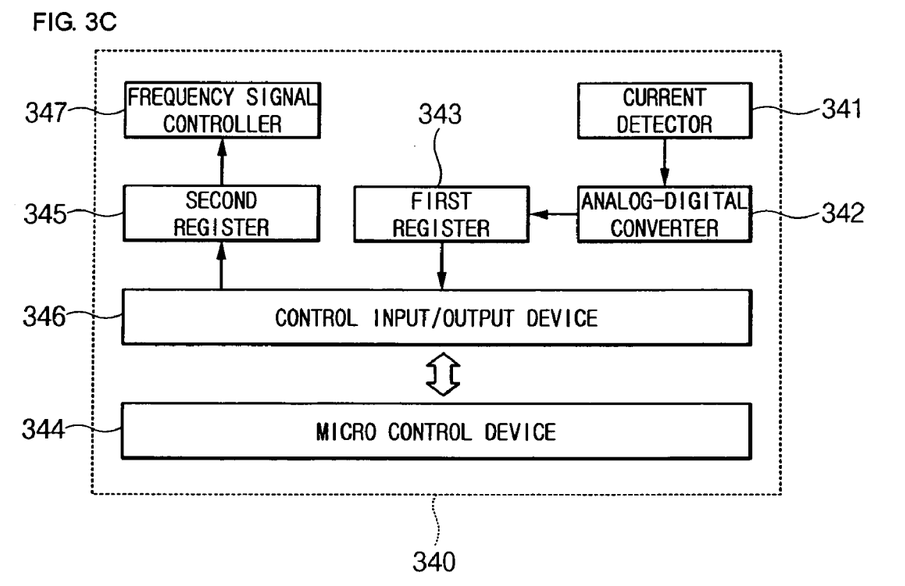
FIG. 3C is a block diagram showing a frequency controller of the first embodiment of the invention.

FIG. 3C is a block diagram showing the frequency controller 340 of the first embodiment of the present invention. As shown in FIG. 3, the frequency controller 340 of the first embodiment is composed of a current detector 341 which is connected to the piezo driver so as to detect and measure a current consumed by the piezo actuator, an analog-digital converter 342 which is connected to the current detector 341 so as to convert the measured current into digital data, a first register 343 which is connected to the analog-digital converter 342 so as to store the converted digital data, a micro control device 344 which receives the digital data stored in the first register 343 so as to detect frequency data corresponding to the digital data on the maximum current among the input digital data, a second register 345 which stores the frequency data detected by the micro control device 344, a control input/output device 346 which is connected to the first and second registers 343 and 345 and the micro control device 344 so as to input the digital data of the first register 343 to the micro control device 344 and to output the frequency data of the micro control device 344 to the second register 345, and a frequency signal controller 347 which is connected to the second register 345 and the frequency synthesizer so as to generate a frequency control signal into the frequency synthesizer, in accordance with the frequency data of the second register 345.

The frequency data detected by the micro control device 344 becomes resonant frequency data of the piezo actuator, so that a frequency control signal corresponding to the resonant frequency data is generated. Then, the piezo actuator is driven by the resonant frequency to thereby enhance the driving efficiency.

Figure 4A:
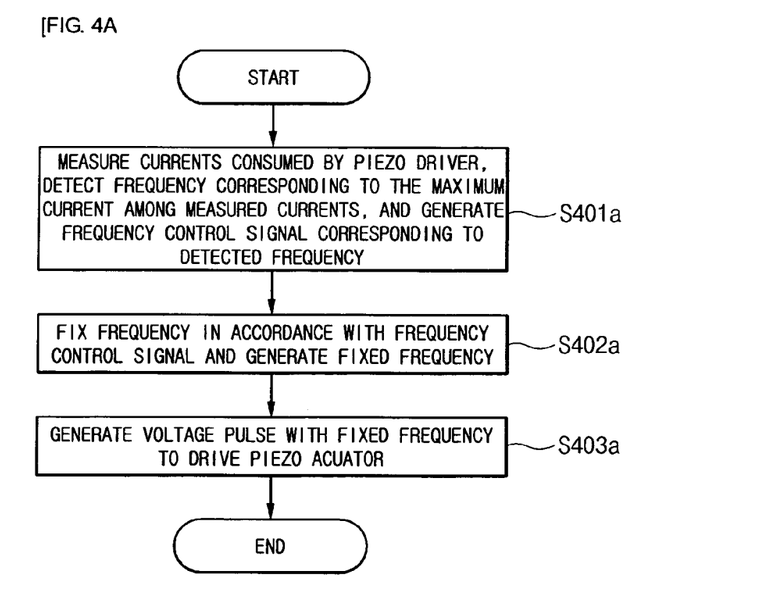
FIG. 4A is a flow chart showing a method of driving the frequency-control-type piezo actuator driving circuit of the first embodiment of the invention.
Figure 4B:
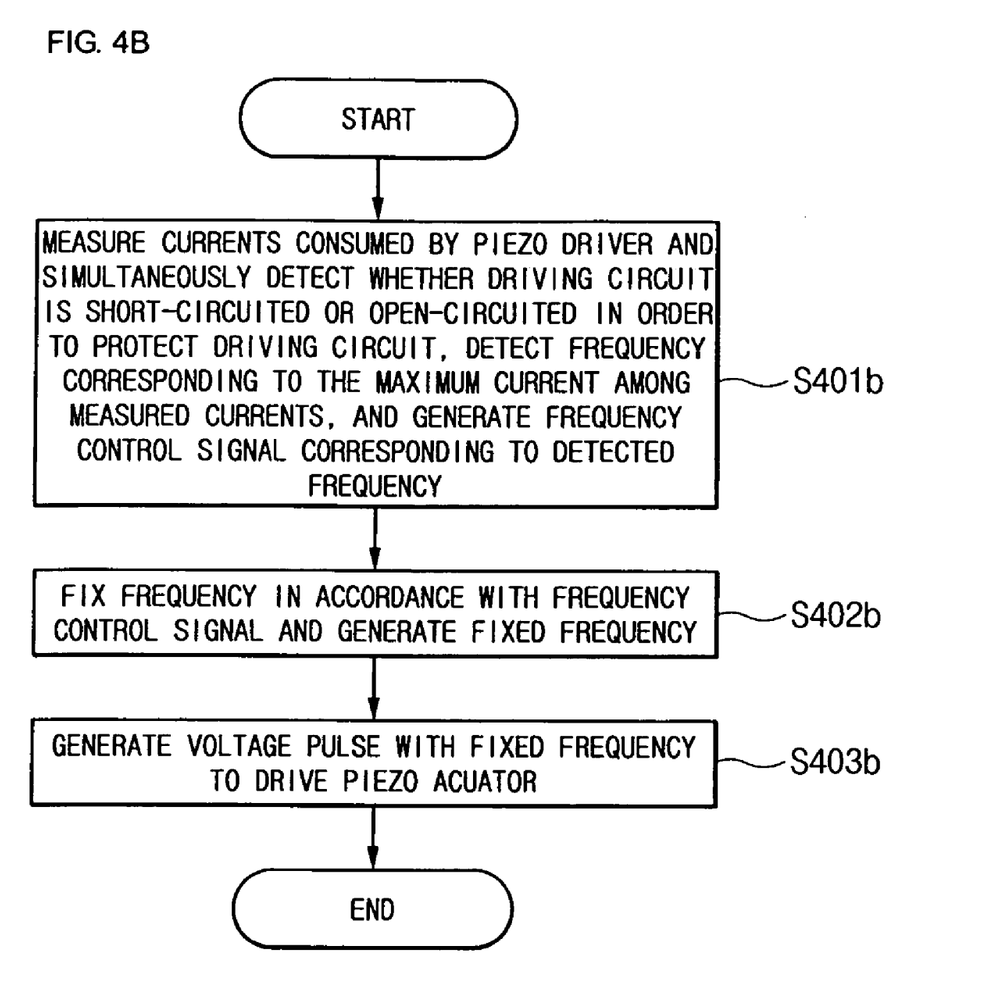
FIG. 4B is a flow chart showing a method of driving the frequency-control-type piezo actuator driving circuit of the second embodiment of the invention.
Figure 4C:
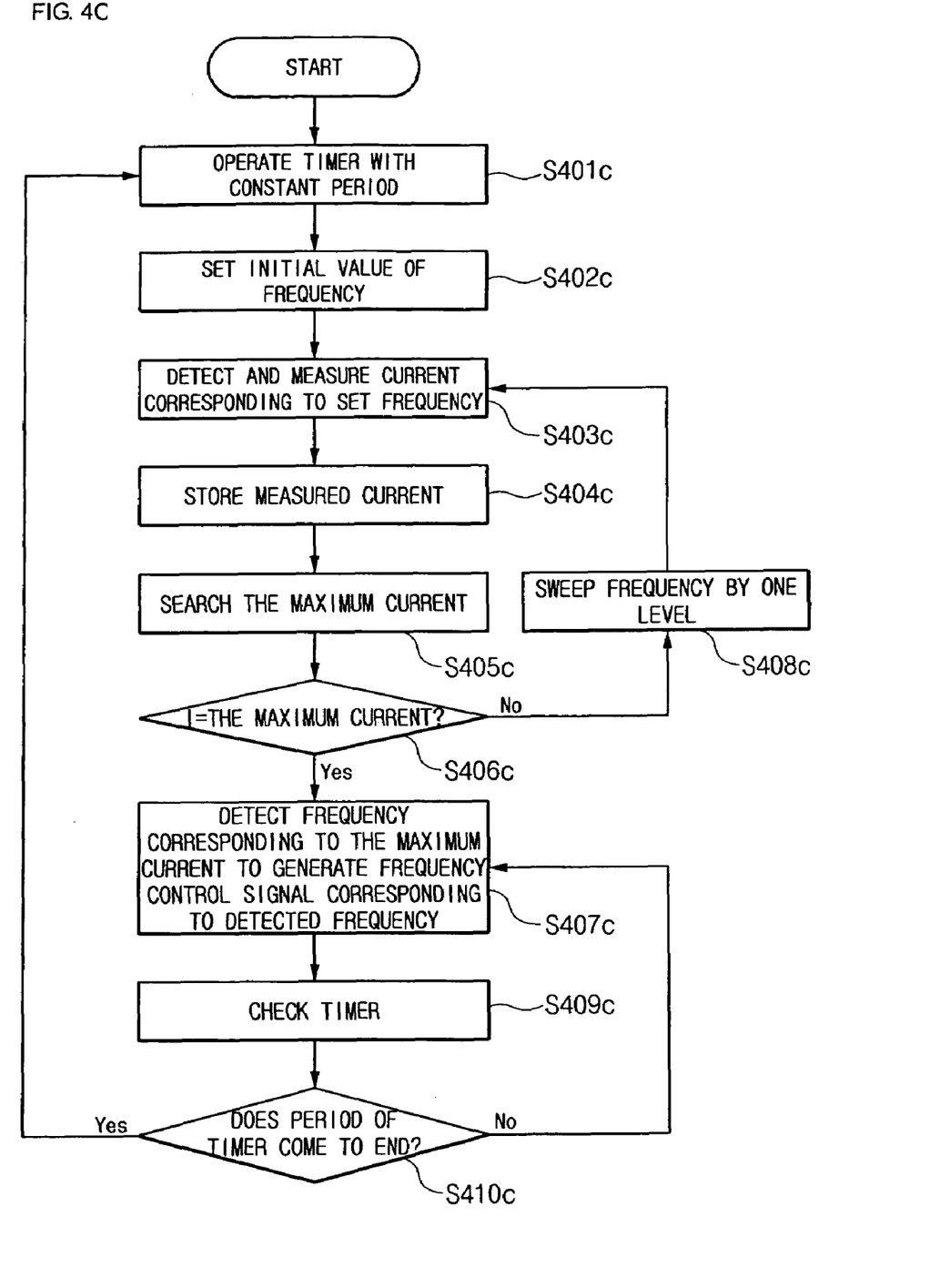
FIG. 4C is a flow chart showing a method in which the frequency controller of the first embodiment of the invention controls a frequency.
Figure 4D:
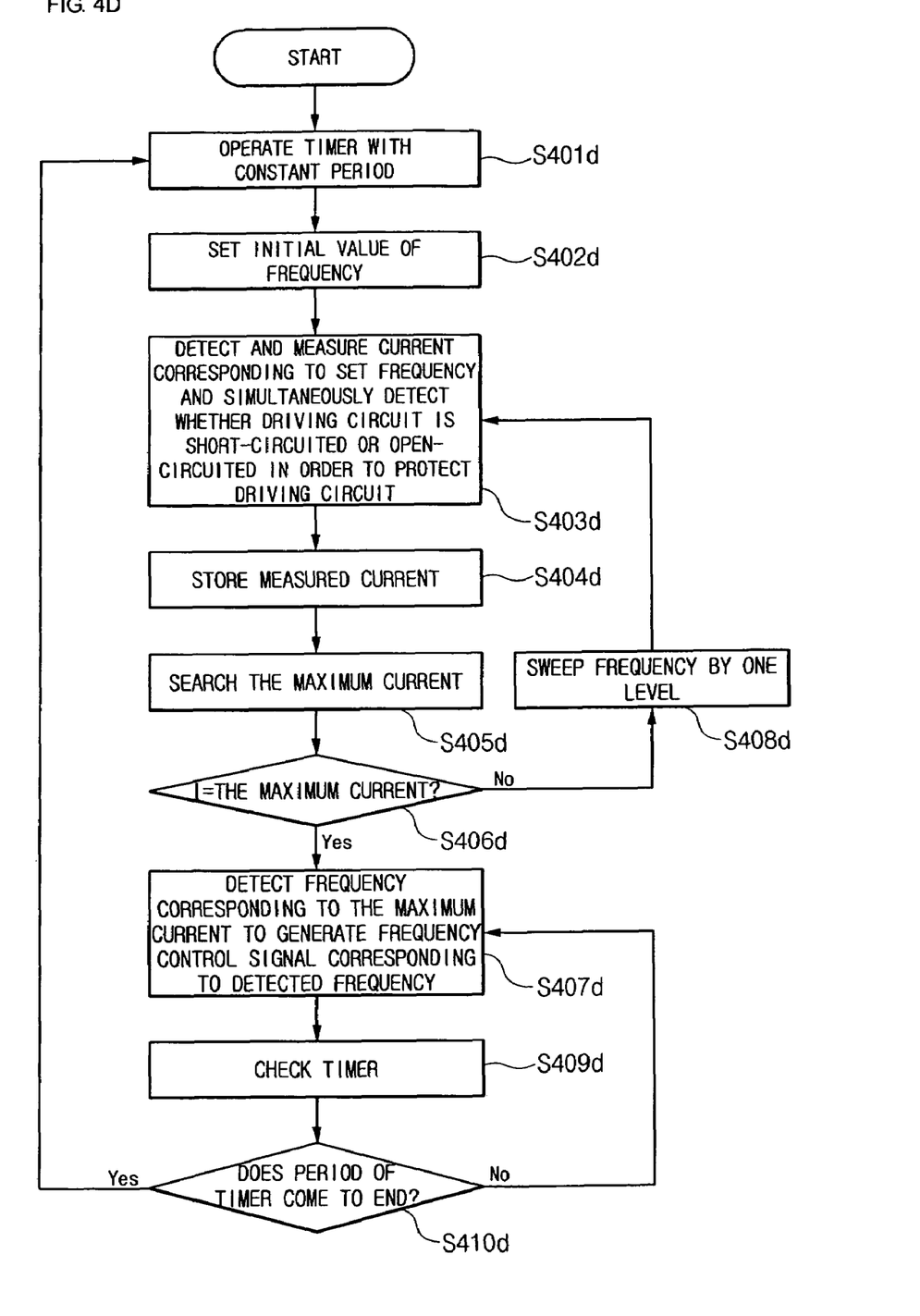
FIG. 4D is a flow chart showing a method in which the frequency controller of the second embodiment of the invention controls a frequency.
Figure 4E:
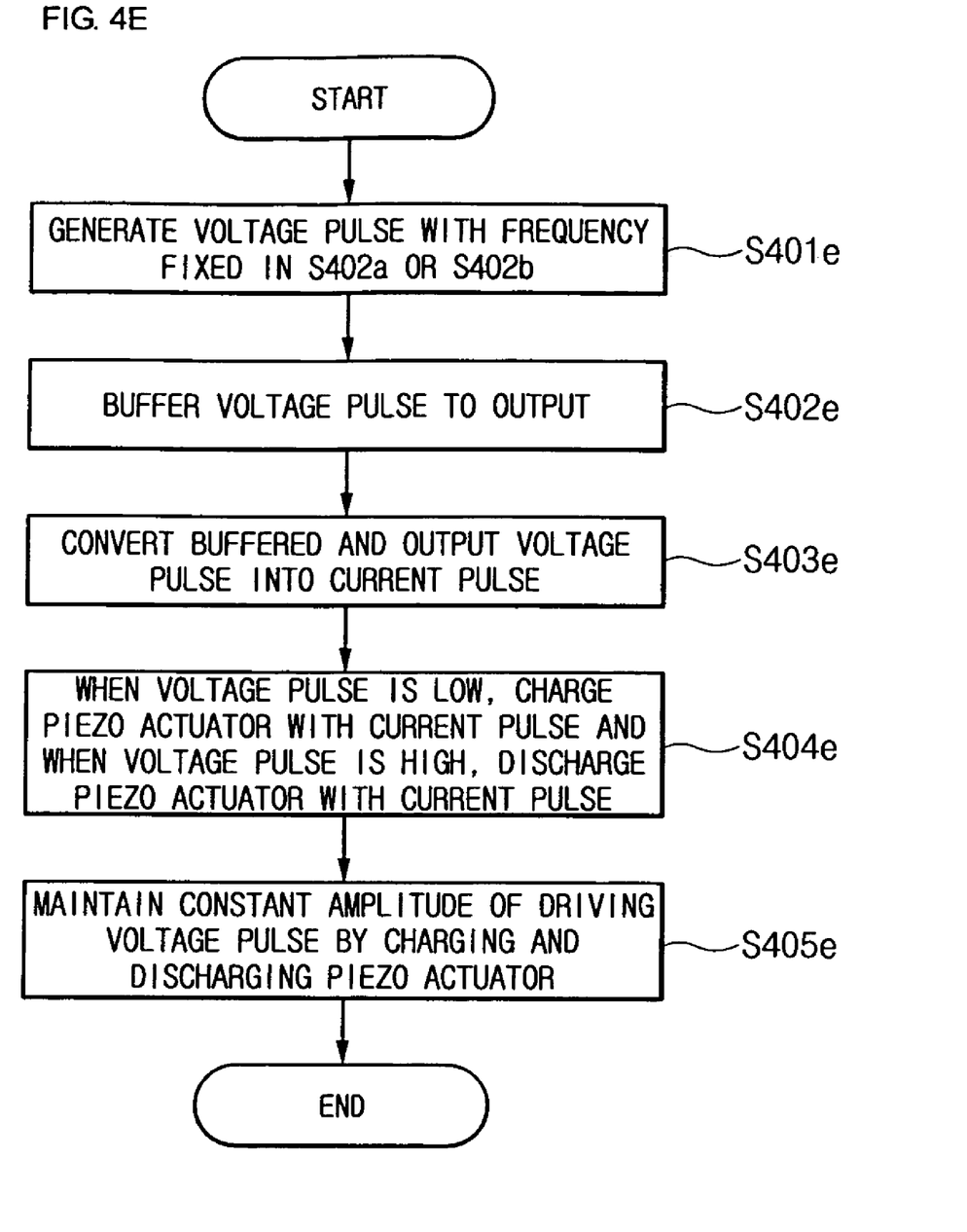
FIG. 4E is a flow chart showing a method in which the piezo driver of the first and second embodiments drives the piezo actuator.

FIG. 4A is a flow chart showing a method of driving the frequency-control-type piezo actuator driving circuit according to the first embodiment of the invention. FIG. 4C is a flow chart showing a method in which the frequency controller of the first embodiment of the invention controls a frequency. FIG. 4E is a flow chart showing a method in which the piezo driver of the first embodiment of the invention drives the piezo actuator.

As shown in FIG. 4A, the method of driving the driving circuit of the first embodiment can be roughly divided into three steps.

First, currents consumed by the piezo driver driving the piezo actuator are measured, the frequency corresponding to the maximum current among the measured currents is detected, and a frequency control signal corresponding to the detected frequency is generated (S401a).

In accordance with the generated frequency control signal, a frequency is fixed. Then, the fixed frequency is generated (S402a).

A voltage pulse with the fixed frequency is generated to drive the piezo actuator (S403a).

Among the steps shown in FIG. 4A, the step S401a proceeds according to the flow chart shown in FIG. 4C. The description thereof will be made as follows.

First, a timer with a constant period is operated (S401c).

Next, an initial value of frequency is set (S402c).

Next, a current corresponding to the set frequency is detected, and the value thereof is measured (S403c).

Next, the measured current is stored (S404c).

Next, the maximum current among the stored currents is searched (S405c).

Next, it is determined whether the detected current is the maximum current or not (S406c).

Next, when the determined current is the maximum current, the frequency corresponding to the maximum current is detected to generate a frequency control signal corresponding to the detected frequency (S407c).

Finally, the timer is checked to determine whether the period of the timer comes to an end or not (S410c).

However, when the current determined in the step S406c is not the maximum current, the frequency is swept by one level (S408c). The step is fed back to the step S403c, and the following steps are performed.

When it is determined in the step S410c that the period of the timer does not come to an end, the step is fed back to the step S407c, and the following steps are performed. When it is determined that the period of the timer comes to an end, the step is fed back to the step S401c, and the following steps are performed.

In the step S407c, the resonant frequency of the piezo actuator is detected, so that a frequency control signal corresponding to the resonant frequency is generated. Then, the piezo actuator is driven by the resonant frequency to thereby enhance the driving efficiency thereof.

Among the steps shown in FIG. 4A, the step S403a proceeds according to the flow chart shown in FIG. 4E, and the description thereof will be made as follows.

First, a voltage pulse with the frequency generated in the step S402a is generated (S401e).

Next, the generated voltage pulse is buffered (S402e).

Next, the buffered voltage pulse is converted into a current pulse (S403e).

Next, when the generated voltage pulse is low, the piezo actuator is charged by the converted current pulse. When the generated voltage pulse is high, the piezo actuator is discharged by the converted current pulse (S404e).

Finally, through the step where the piezo actuator is charged or discharged, a constant amplitude of driving voltage pulse is maintained (S405e). At this time, the driving voltage pulse is maintained at an amplitude of more than 10 volts.

Second Embodiment

A block diagram of a piezo actuator driving circuit according to a second embodiment of the present invention is the same as the block diagram of the piezo actuator according to the first embodiment shown in FIG. 3A. A circuit diagram of a piezo driver and piezo element of the driving circuit according to the second embodiment is the same as the circuit diagram of the piezo driver and piezo element of the driving circuit according to the first embodiment shown in FIG. 3B.

Figure 3D:
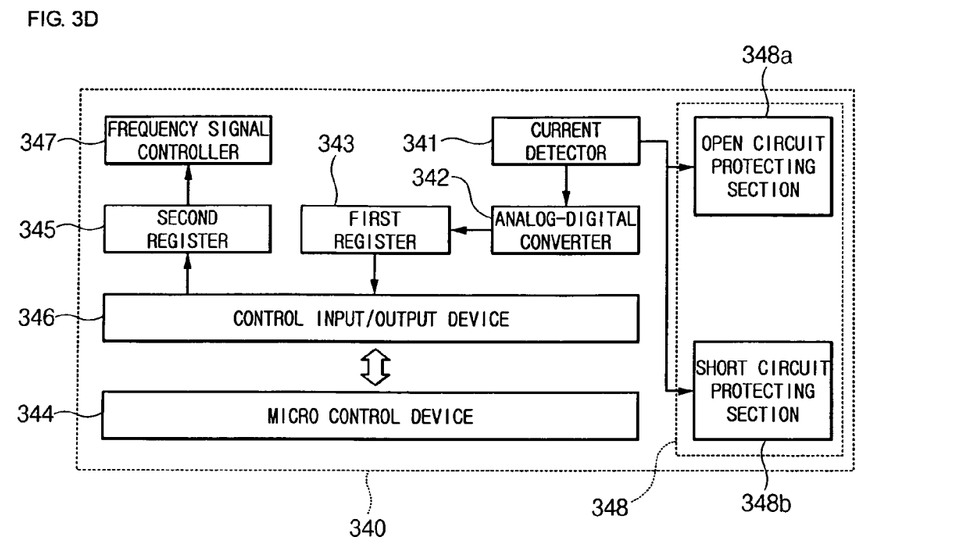
FIG. 3D is a block diagram showing a frequency controller of the second embodiment of the invention.

The frequency controller of the second embodiment is constructed so that a circuit protecting section is further included in the frequency controller 340 of the first embodiment shown in FIG. 3C. FIG. 3D shows the construction.

FIG. 3D is a block diagram showing the frequency controller 340 of the second embodiment according to the invention. As shown in FIG. 3D, the frequency controller 340 is composed of the current detector 341 which is connected to the piezo driver so as to detect and measure currents consumed by the piezo driver, a circuit protecting section 348 which is connected to the piezo driver and the current detector 341 so as to prevent the driving circuit from being short-circuited or open-circuited, the analog-digital converter 342 which is connected to the current detector 341 so as to convert the measured current into digital data, the first register 343 which is connected to the analog-digital converter 342 so as to store the converted digital data, the micro control device 344 which receives the digital data stored in the first register 343 so as to detect frequency data corresponding to the digital data on the maximum current among the input digital data, the second register 345 which stores the frequency data detected by the micro control device 344, the control input/output device 346 which is connected to the first and second registers 343 and 345 and the micro control device 344 so as to input the digital data of the first register 343 into the micro control device 344 and to output the frequency data of the micro control device 344 into the second register 345, and the frequency signal controller 347 which is connected to the second register 345 and the frequency synthesizer so as to generate a frequency control signal to the frequency synthesizer in accordance with the frequency data of the second register 345.

The circuit protecting section 348, which is composed of an open circuit protecting section 348a and short circuit protecting section 348b, prevents the driving circuit from being open-circuited or short-circuited, which makes it possible to remove the defects caused by damage of the circuit.

The frequency data detected by the micro control device 344 becomes the resonant frequency of the piezo actuator, so that a frequency control signal corresponding to the resonant frequency data is generated. Then, the piezo actuator is driven by the resonant frequency to thereby enhance the driving efficiency.

On the other hand, a method in which the piezo driver of the second embodiment drives the piezo actuator is the same as the method in which the piezo driver of the first embodiment shown in FIG. 4E drives the piezo actuator. However, a step S401e of the second embodiment is where a voltage pulse with a frequency fixed in a step S402b, which will be described below, is generated.

As the circuit protecting section is further included in the frequency controller of the second embodiment, a method of driving the frequency-control-type piezo actuator driving circuit and a method in which the frequency controller controls a frequency are slightly different from the methods shown in FIGS. 4A and 4C. FIGS. 4B and 4D explain the difference.

FIG. 4B is a flow chart showing a method of driving the frequency-control-type piezo actuator driving circuit of the second embodiment of the invention, and FIG. 4D is a flow chart showing a method in which the frequency controller of the second embodiment of the invention controls a frequency.

As shown in FIG. 4B, the method of driving the driving circuit of the second embodiment is roughly divided into three steps.

First, currents consumed by the piezo driver driving the piezo actuator are measured and simultaneously, it is detected whether the driving circuit is open-circuited or short-circuited, in order to protect the driving circuit. The frequency corresponding to the maximum current among the measured currents is detected, so that a frequency control signal corresponding to the detected frequency is generated (S401b).

A frequency is fixed in accordance with the generated frequency control signal, and the fixed frequency is generated (S402b).

A voltage pulse with the fixed frequency is generated to drive the piezo actuator (S403b).

Among the steps shown in FIG. 4B, the step S401b proceeds according to the flow chart shown in FIG. 4D, and the description thereof will be made as follows.

First, a timer with a constant period is operated (S401d).

Next, an initial value of frequency is set (S402d).

Next, a current corresponding to the set frequency is detected and measured and simultaneously, it is detected whether the driving circuit is short-circuited or open-circuited, in order to protect the driving circuit (S403d).

Next, the measured current is stored (S404d).

Next, the maximum current among the stored currents is searched (S405d).

Next, it is determined whether the searched current is the maximum current or not (S406d).

Next, when the determined current is the maximum current, a frequency corresponding to the maximum current is detected, and a frequency control signal corresponding to the detected frequency is generated (S407d).

Finally, the timer is checked (S409d), and it is determined whether the period of the timer comes to an end or not (S410d).

However, when the current determined in the step S406d is not the maximum current, the frequency is swept by one level (S408d). The step is fed back to the step S403d, and the following steps are performed.

When it is determined in the step S410d that the period of the timer does not come to an end, the step is fed back to the step S407d, and the following steps are performed. When it is determined that the period of the timer comes to an end, the step is fed back to the step S401d, and the following steps are performed.

Since the resonant frequency of the piezo actuator is detected in the step S407d, the frequency control signal corresponding to the resonant frequency is generated. Then, the piezo actuator is driven by the resonant frequency, so that the driving efficiency thereof can be enhanced.

According to the frequency-control-type piezo actuator driving circuit and the method of driving the same, the current consumed by the piezo actuator is measured to automatically control the resonant frequency, which makes it possible to control a change in the resonant frequency due to process variation or temperature change.

Figure 5:
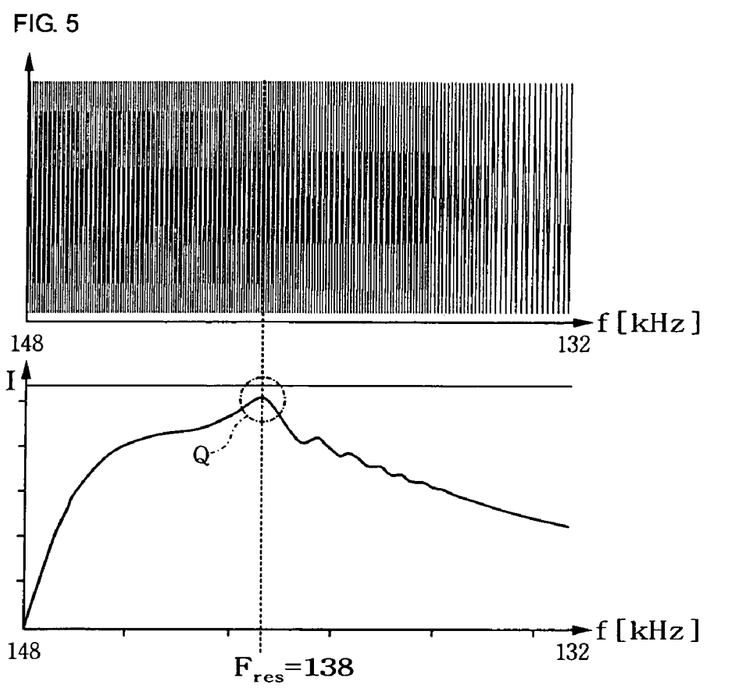
FIG. 5 is a diagram showing a change in an amount of current consumed by the piezo actuator in accordance with the frequency sweep.

FIG. 5 is a diagram showing a change in an amount of current consumed by the piezo actuator in accordance with the frequency sweep. When a frequency of 132 kHz to 148 kHz is swept, the maximum current is consumed at a point Q corresponding to a frequency of about 138 kHz, as shown in FIG. 5. Then, the resonant frequency of the piezo actuator can be controlled at 138 kHz. Therefore, even though the resonant frequency changes due to process variation or temperature change, the application of the driving circuit and the method of driving the same according to the invention can control the resonant frequency at such a frequency that can drive the piezo actuator most effectively.

As the resonant frequency is automatically controlled, the driving efficiency of the piezo actuator can be enhanced.

Figure 6:
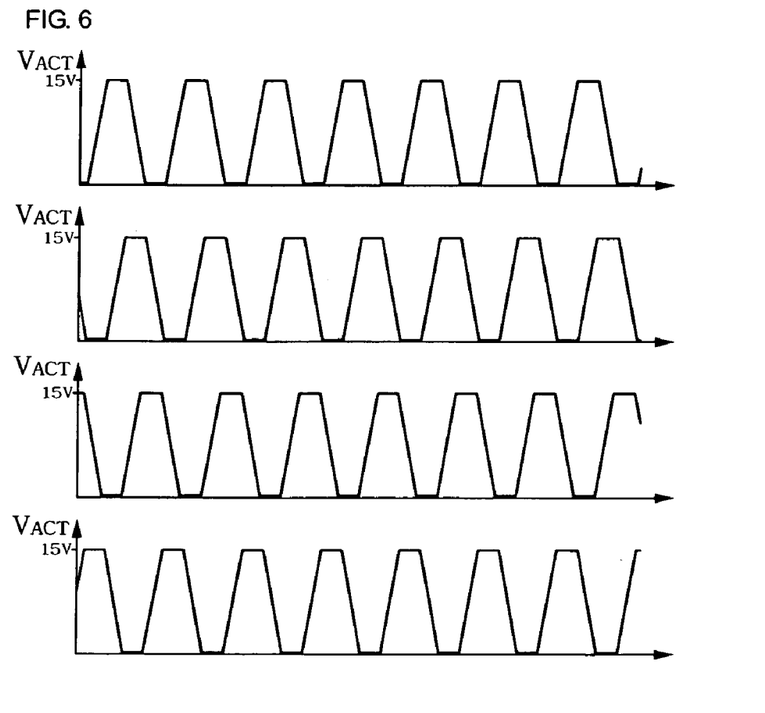
FIG. 6 is a diagram showing an output signal of the piezo actuator according to the invention.

FIG. 6 is a diagram showing output signals of the piezo actuator according to the invention. Four waveforms shown in FIG. 6 respectively show waveforms of four piezo elements composing the piezo actuator.

In the present invention, the resonant frequency is controlled, and the piezo actuator is driven by the resonant frequency. Therefore, the driving voltage pulse with a constant amplitude (more than 10V) can be secured, to thereby enhance the driving efficiency of the piezo actuator.

Furthermore, the amount of current consumed by the piezo actuator is measured to detect the resonant frequency. Therefore, it can be easily determined whether the driving circuit is open-circuited or short-circuited, which makes it possible to prevent the driving circuit from being damaged.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A frequency-control-type piezo actuator driving circuit comprising:
    a piezo actuator that is driven by a constant amplitude of driving voltage pulse;
    a piezo driver that is connected to the piezo actuator so as to drive the piezo actuator;
    a frequency controller that is connected to the piezo driver so as to measure currents consumed when the piezo driver drives the piezo actuator, to detect a frequency corresponding to the maximum current among the measured currents, and to generate a frequency control signal corresponding to the detected frequency; and
    a frequency synthesizer that fixes a frequency of the piezo actuator in accordance with the frequency control signal of the frequency controller and generates the fixed frequency to the piezo driver;
    wherein the piezo driver includes:
    a pulse generator that generates a voltage pulse with the fixed frequency;
    a first driver stage that receives the voltage pulse of the pulse generator and buffers the voltage pulse to output; and
    a second driver stage that converts the voltage pulse, buffered and output by the first driver stage, into a current pulse to output to the piezo actuator.

2. The frequency-control-type piezo actuator driving circuit according to claim 1, wherein the first deriver stage is a buffering inverter.

3. The frequency-control-type piezo actuator driving circuit according to claim 1, wherein the second driver stage includes:
    a first current source that transmits a current pulse for charging the piezo actuator;
    a first switching element that receives a voltage pulse of the pulse generator and is connected to a power supply voltage and the first current source;
    a second current source that transmits a current pulse for discharging the piezo actuator; and
    a second switching element that receives a voltage pulse of the pulse generator and is connected to a ground voltage and the second current source.

4. The frequency-control-type piezo actuator driving circuit according to claim 3, wherein the first switching element is a PMOS transistor, and the second switching element is an NMOS transistor.

5. The frequency-control-type piezo actuator driving circuit according to claim 4, wherein, when the voltage pulse of the pulse generator is low, the PMOS transistor is turned on to charge the piezo actuator.

6. The frequency-control-type piezo actuator driving circuit according to claim 4, wherein, when the voltage pulse of the pulse generator is high, the NMOS transistor is turned on to discharge the piezo actuator.

7. The frequency-control-type piezo actuator driving circuit according to claim 1, wherein the piezo actuator includes:
    an inductor stage composed of an inductor, a first capacitor, and a resistance, which are connected in series; and
    a second capacitor that is connected in parallel to the inductor stage so as to resonate and maintains the driving voltage pulse with a constant amplitude by charging and discharging the current pulse output by the second driver stage.

8. A frequency-control-type piezo actuator driving circuit comprising:
    a piezo actuator that is driven by a constant amplitude of driving voltage pulse;
    a piezo driver that is connected to the piezo actuator so as to drive the piezo actuator;
    a frequency controller that is connected to the piezo driver so as to measure currents consumed when the piezo driver drives the piezo actuator, to detect a frequency corresponding to the maximum current among the measured currents, and to generate a frequency control signal corresponding to the detected frequency; and
    a frequency synthesizer that fixes a frequency of the piezo actuator in accordance with the frequency control signal of the frequency controller and generates the fixed frequency to the piezo driver;
    wherein the frequency controller includes:
    a current detector that is connected to the piezo driver so as to detect and measure currents consumed by the piezo driver;
    an analog-digital converter that is connected to the current detector so as to convert the measured current into digital data;
    a first register that is connected to the analog-digital converter so as to store the converted digital data;
    a micro control device that receives the digital data stored in the first register so as to detect frequency data corresponding to the digital data on the maximum current among the received digital data;
    a second register that stores frequency data detected by the micro control device;
    a control input/output device that is connected to the first and second registers and the micro control device so as to input the digital data of the first register to the micro control device and to output the frequency data of the micro control device to the second register; and
    a frequency signal controller that is connected to the second register and the frequency synthesizer so as to generate a frequency control signal to the frequency synthesizer in accordance with the frequency data of the second register.

9. The frequency-control-type piezo actuator driving circuit according to claim 8 further including a circuit protecting section that is connected to the piezo driver and the current detector so as to prevent the driving circuit from being short-circuited or open-circuited.

10. The frequency-control-type piezo actuator driving circuit according to claim 9, wherein the circuit protecting section is composed of an open circuit protecting section and short circuit protecting section.

11. The frequency-control-type piezo actuator driving circuit according to claim 1, wherein the amplitude of the driving voltage pulse is more than or equal to 10 volts.

12. The frequency-control-type piezo actuator driving circuit according to claim 8, wherein the frequency detected by the micro control device is a resonant frequency.

13. A method of driving a frequency-control-type piezo actuator comprising:
controlling a frequency by measuring currents consumed by a piezo driver driving the piezo actuator, detecting a frequency corresponding to the maximum current among the measured currents, and generating a frequency control signal corresponding to the detected frequency;
fixing a frequency in accordance with the generated frequency control signal and generating the fixed frequency; and
generating a voltage pulse with the fixed frequency so as to drive the piezo actuator;
wherein the step of generating a voltage pulse so as to drive the piezo actuator includes:
generating a voltage pulse with the frequency generated in the step of fixing and generating a frequency;
buffering the generated voltage pulse;
converting the buffered voltage pulse into a current pulse;
when the generated voltage pulse is low, charging the piezo actuator with the converted current pulse;
when the generated voltage pulse is high, discharging the piezo actuator with the convened current pulse; and
maintaining a constant of driving voltage pulse through the steps of charging and discharging the piezo actuator so as to drive the piezo actuator.

14. The method of driving a frequency-control-type piezo actuator according to claim 13, wherein the step of controlling a frequency includes:
operating a timer with a constant period;
setting an initial value of frequency;
detecting and measuring a current corresponding to the set frequency;
storing the measured current;
searching the maximum current among the stored currents;
determining whether the searched current is the maximum current or not;
when the determined current is the maximum current, detecting a frequency corresponding to the maximum current so as to generate a frequency control signal corresponding to the detected frequency; and
checking the timer so as to determine whether the period of the timer comes to an end or not.

15. The method of driving a frequency-control-type piezo actuator according to claim 14, wherein, when the determined current is not the maximum current, the frequency is swept by one level, and the step is fed back to the step of detecting and measuring a current.

16. The method of driving a frequency-control-type piezo actuator according to claim 14, wherein, when it is determined that the period of the timer does not come to an end, the step is fed back to the step of detecting a frequency.

17. The method of driving a frequency-control-type piezo actuator according to claim 14, wherein, when it is determined that the period of the timer comes to an end, the step is fed back to the step of operating a timer.

18. The method of driving a frequency-control-type piezo actuator according to claim 14, wherein the step of detecting and measuring a current further includes protecting a driving circuit so as to prevent the circuit from being short-circuited and open-circuited.

19. The method of driving a frequency-control-type piezo actuator according to claim 14, wherein a resonant frequency is detected in the step of detecting a frequency.

20. The method of driving a frequency-control-type piezo actuator according to claim 13, wherein, in the step of maintaining a driving voltage pulse, the driving voltage pulse is maintained at more than or equal to 10 volts.

* * * * *